Nov. 1, 1932. T. WAUGH, JR 1,885,661
APPARATUS FOR FORMING GLASSWARE
Filed May 1, 1929  8 Sheets-Sheet 3
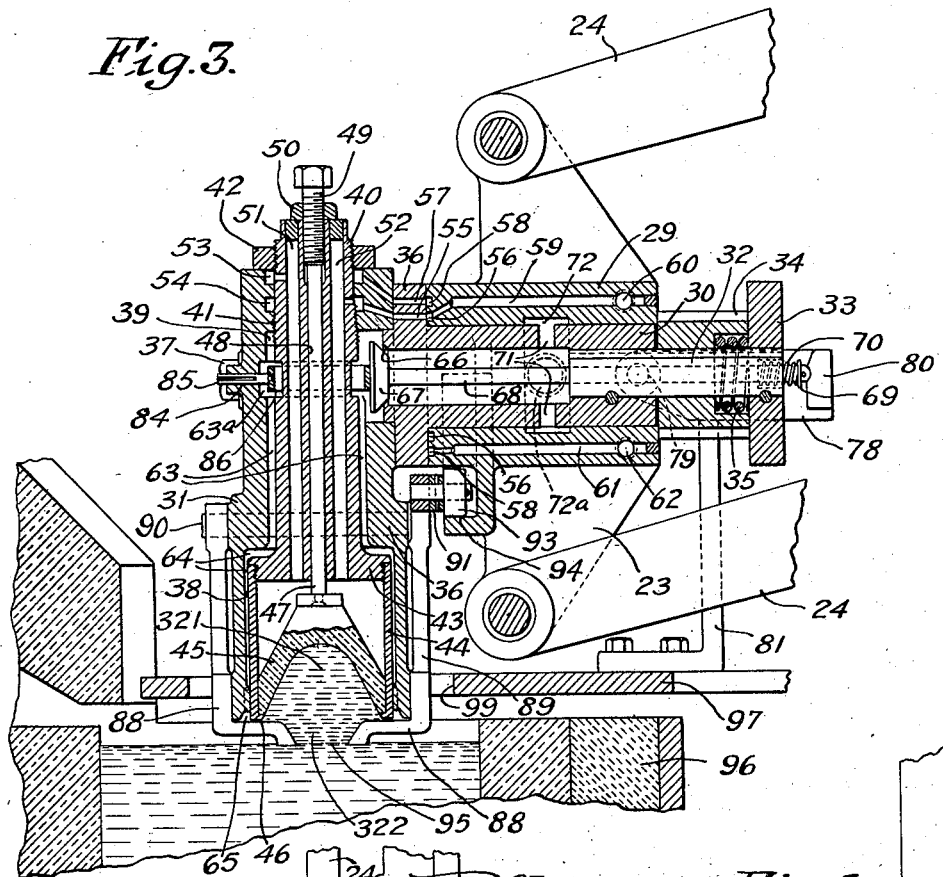
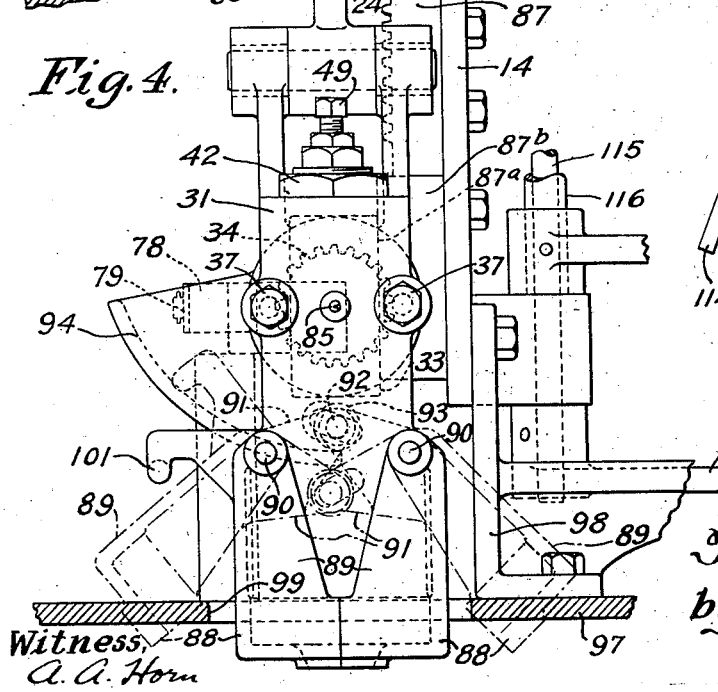
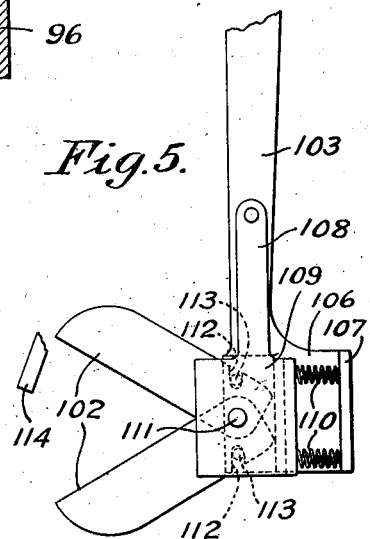
Inventor
Thomas Waugh, Jr.
by Brown & Parham
Attorney
Witness,
A. A. Horn

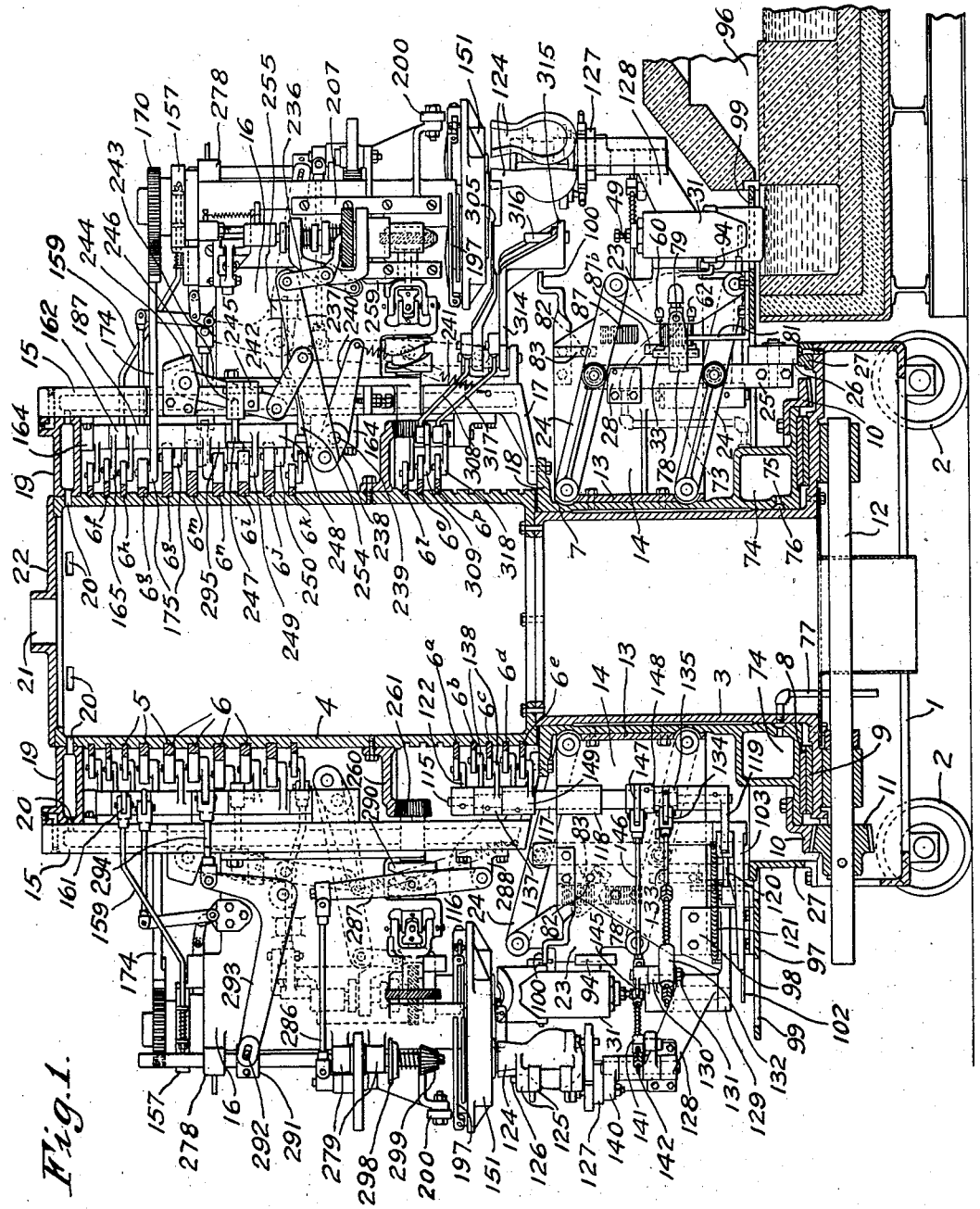

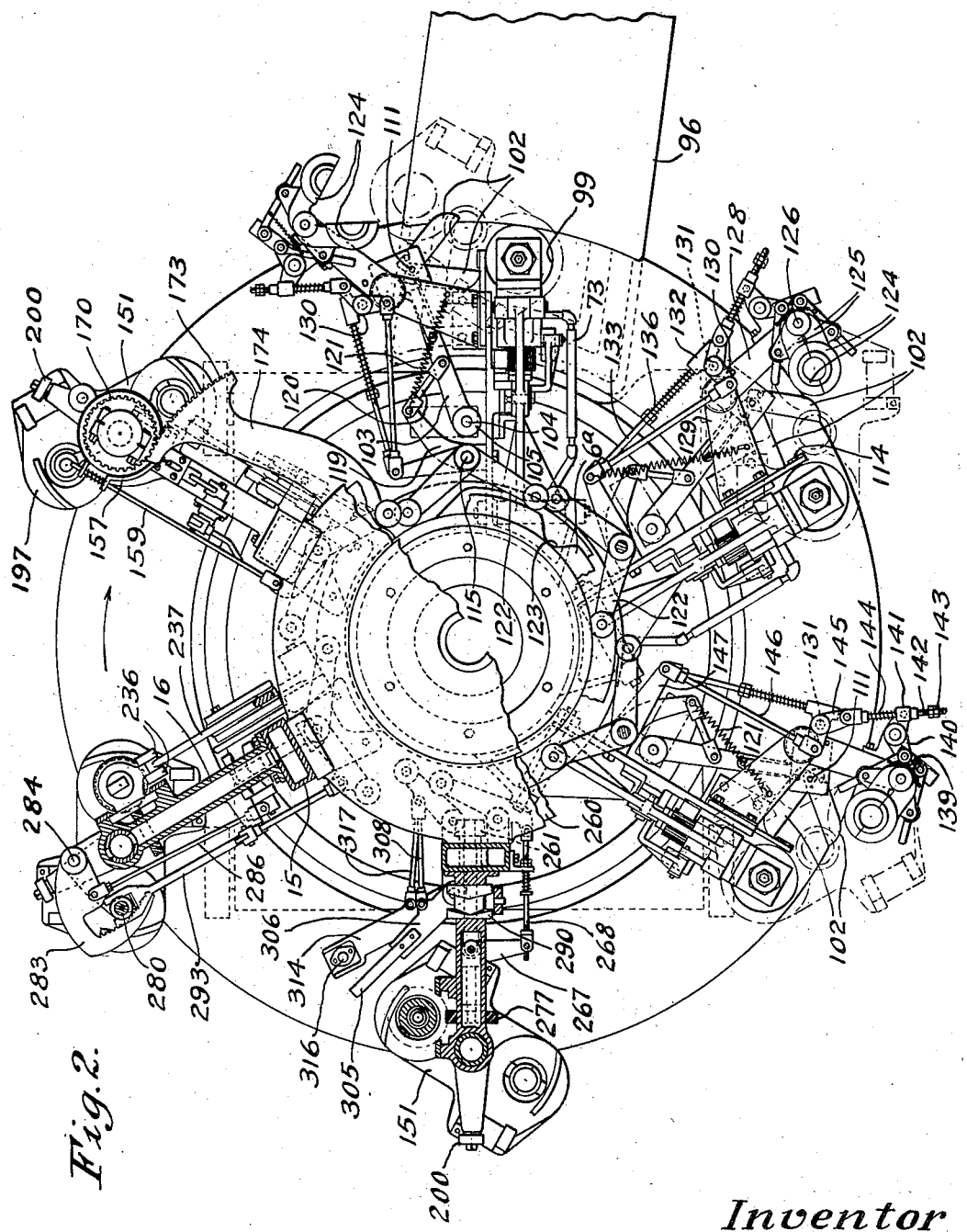

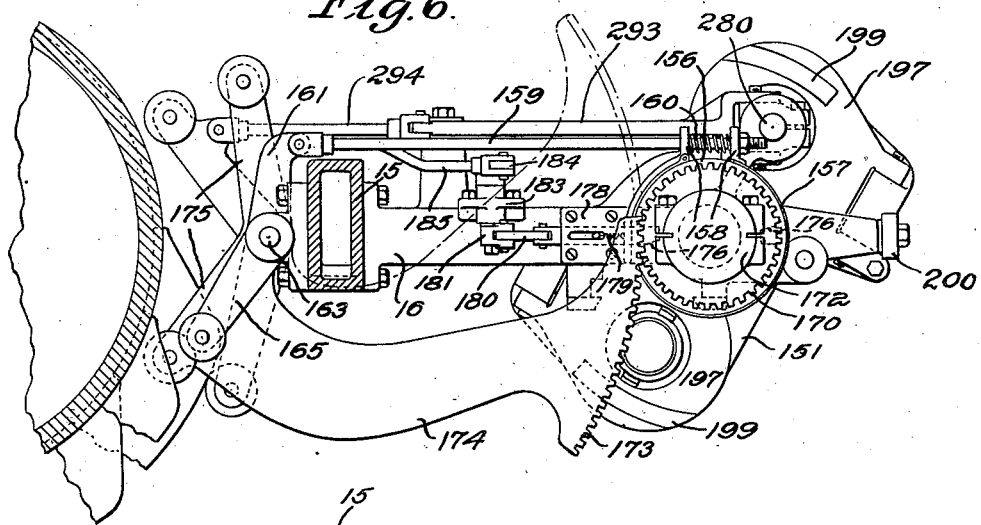

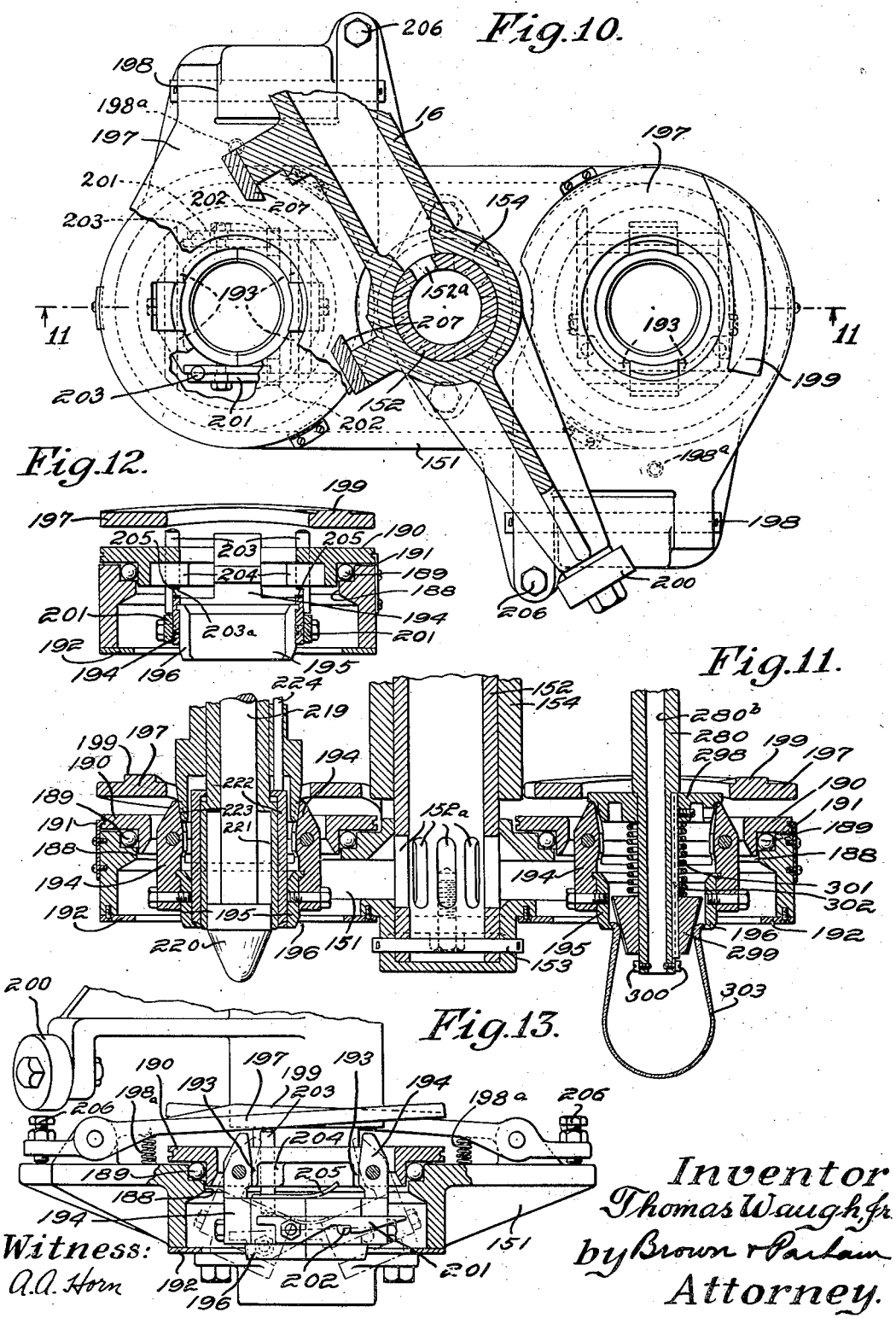

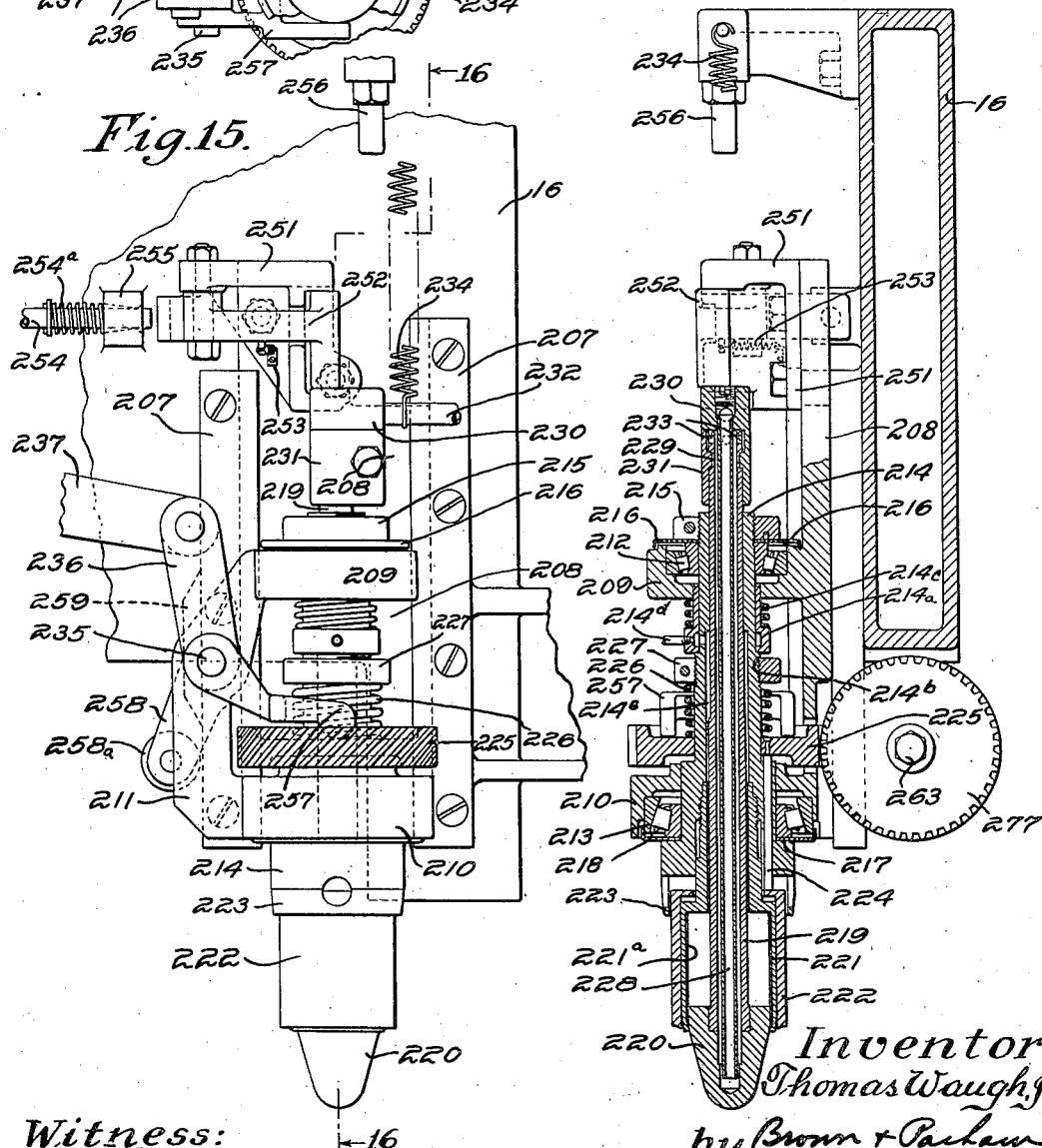

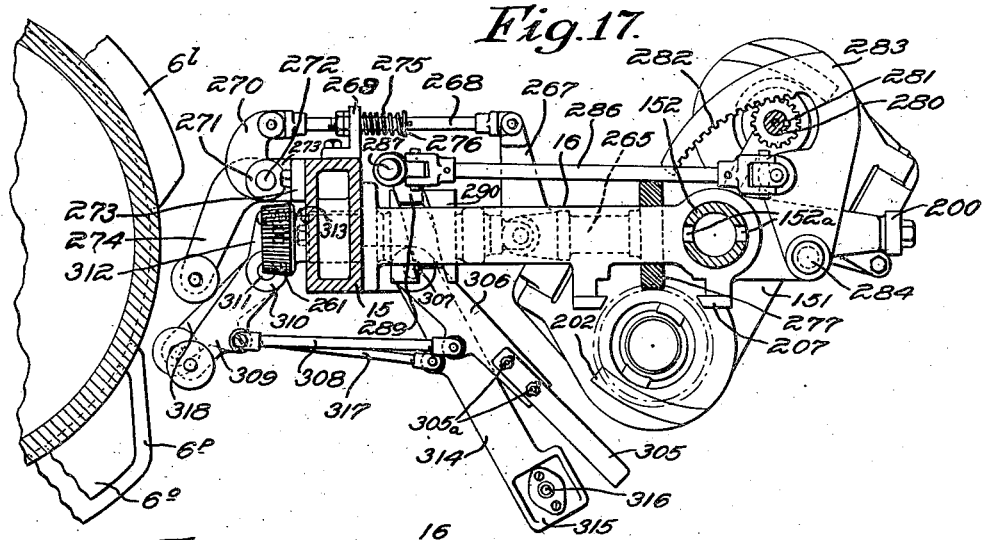
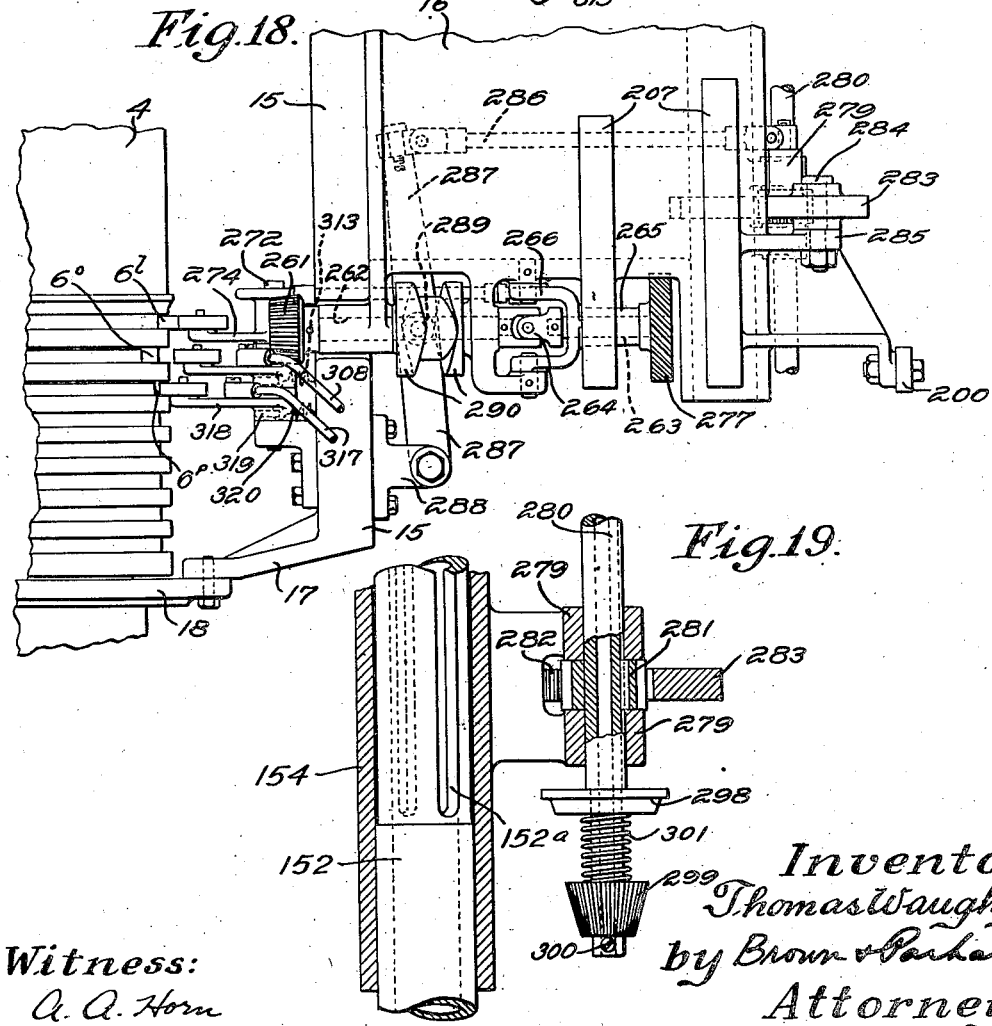

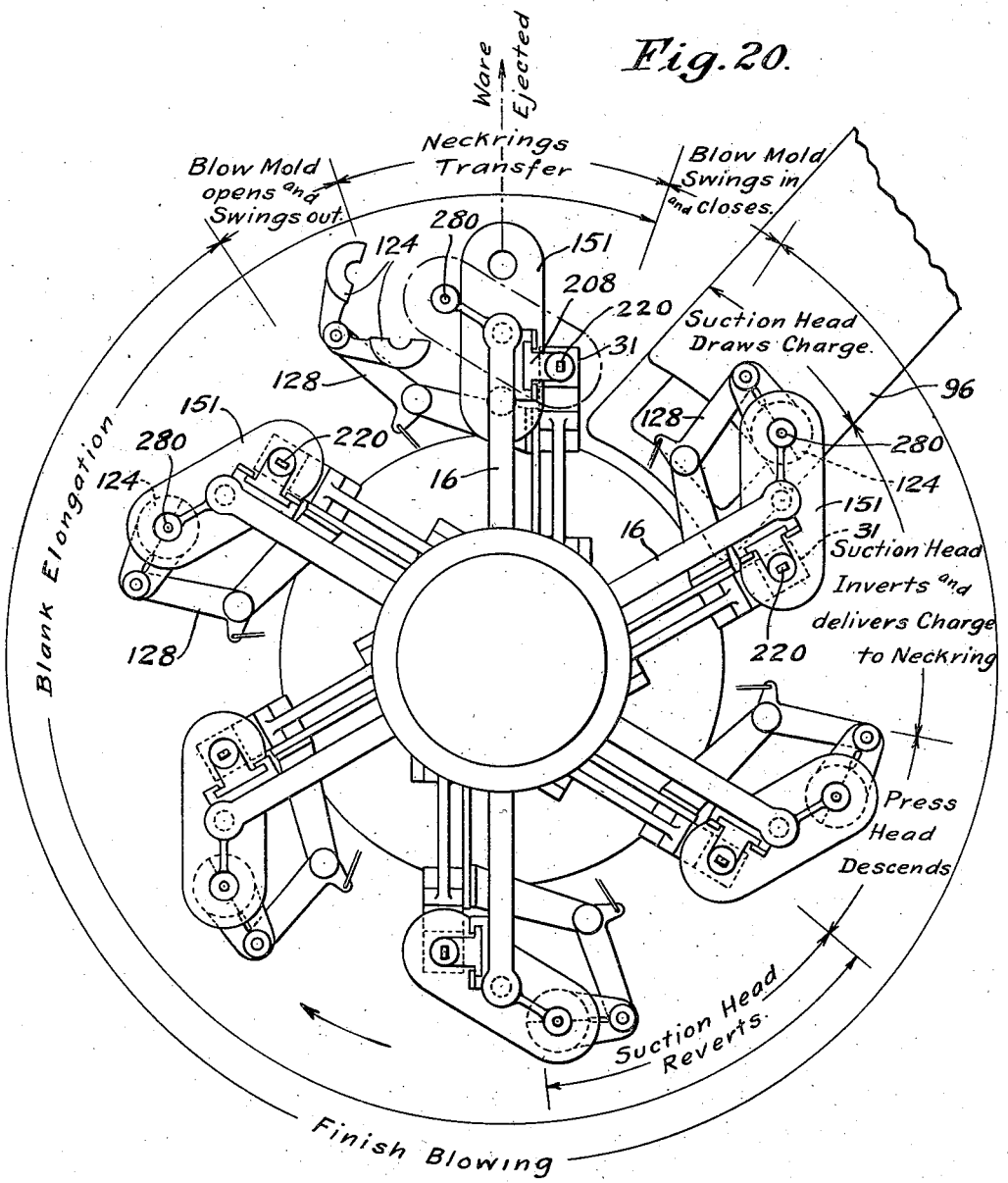

Patented Nov. 1, 1932

1,885,661

UNITED STATES PATENT OFFICE

THOMAS WAUGH, JR., OF WEST HARTFORD, CONNECTICUT, ASSIGNOR TO HARTFORD-EMPIRE COMPANY, OF HARTFORD, CONNECTICUT, A CORPORATION OF DELAWARE

APPARATUS FOR FORMING GLASSWARE

Application filed May 1, 1929. Serial No. 359,589.

My invention relates to apparatus for forming hollow glassware by the press and blow method. It is particularly adapted to the formation of paste mold articles, such as electric light bulbs, tumblers and the like, but may be advantageously employed in the manufacture of other hollow glassware, such as bottles.

Among the principal objects of the invention is to provide a machine and a method of operation whereby the output may be greatly increased and the quality of the ware improved.

In certain of its aspects my invention comprises improvements in apparatus and method over the applications of Robert W. Canfield, Serial No. 31,315, filed May 19, 1925, now Patent No. 1,756,813, issued April 29, 1930, and Serial No. 320,109, filed November 17, 1928.

Among the aforesaid improvements are the following:—

The provision in a machine of the class described of what I term "double cycling", which double cycling involves not simply an increase in the speed of production but also the provision of additional devices and combinations of devices which are believed to be novel in the art.

The provision of a machine of the above described character provided with a plurality of complete, operative units which are adapted to simultaneously form a parison and a finished article.

The provision of a rotary machine provided with a plurality of duplex units each comprising a pair of associated neck ring structures and suitable cooperating molds and blow heads.

A machine of the above described character in which each of the separate units comprise a single parison mold, a single blow mold, and an associated pair of neck rings, each of which alternately cooperates with the parison mold and with the blow mold.

A machine of the above described character in which novel means are provided for shifting the neck rings to alternately present them to the parison mold and to the blow mold and means for rotating the neck rings about their axes.

Other novel features of construction and mode of operation and also of arrangement of parts will appear from the description and drawings.

In the accompanying drawings, wherein I have illustrated a practical embodiment of the principles of my invention, Fig. 1 is a diametric section of the machine on a vertical plane.

Fig. 2 is a plan view of the machine, certain of the parts being omitted and others shown in section for the sake of clearness.

Fig. 3 is a vertical section of a parison mold assembly, the mold being shown inverted and the tank being shown broken away and shown in section.

Fig. 4 is an elevation of a parison mold assembly looking toward the axis of the machine.

Fig. 5 is an enlarged detail in plan of one of the shear mechanisms;

Fig. 6 is an enlarged detail in plan showing the neck-ring platform and the means for intermittently rotating the same;

Fig. 7 is an elevation of the same;

Fig. 8 is a detail in plan, with parts broken away, showing the assemblage at the upper end of the stem by which the neck-ring platform is supported;

Fig. 9 is a vertical section of the same;

Fig. 10 is a broken horizontal section through one of the upper frames and also showing the neck-rings, their platform and their covers;

Fig. 11 is a sectional view taken along the the line 11—11 in Fig. 10;

Fig. 12 is a vertical section through the platform, the neck-ring and its cover, the same being taken on a vertical plane;

Fig. 13 is an end view of the neck-ring platform, the carrier and the neck-ring, the latter being broken away for the sake of clearness;

Fig. 14 is an enlarged and broken plan view showing one of the press head assemblages;

Fig. 15 is an elevation of the same;

Fig. 16 is a sectional view taken along the line 16—16 in Fig. 15;

Fig. 17 is an enlarged detail view in plan showing the neck-ring carrier, the means for oscillating the blow head, the necking tool and the parison-reheating of a unit;

Fig. 18 is a broken elevation of the same;

Fig. 19 is a detail in vertical section showing the mounting of the blow head stem;

Fig. 20 is a diagrammatic plan view illustrating the operation of the machine.

Referring to the drawings, 1 is a portable base of the machine supported on wheels 2.

A vertical cylindrical column 3 is mounted on the base 1 and has in turn mounted thereon the cam-drum 4 which is provided with circumferentially disposed grooves 5 for the detachably mounted cam-plates which are generally indicated by the numeral 6.

A cylindrical turret 7 is rotatably mounted on the column 3 and has at its lower end an annular bearing plate 8 which is in sliding surface contact with the bearing plate 9 of the base, a film of oil being maintained between the two plates.

The skirt of the turret 7 is provided with an annular bevelled gear 10 which is in mesh with a bevelled pinion 11 mounted on the horizontally disposed driving shaft 12 which is journaled in the base. Thus the turret 7 is revolved on the column 3, the movement being assumed to be in a direction which is clockwise in Fig. 2.

The machine is composed of a plurality of complete operative units symmetrically arranged in relation to the axis of the machine, and each unit comprising an invertible parison-mold, a blow-mold, shears, a rotatable neck-ring platform, a pair of neck-rings, parison-pressing means, blowing means, a necking tool, parison-reheating means, and mechanism for operating the same.

The units are supported from the turret by means of lower and upper frames. The lower frames each comprises a vertical back plate 13, which is detachably secured, as by bolts, to the perimetral surface of the turret 7, and a vertically disposed web 14 which extends outwardly radially of the axis of the turret. The members 13 and 14 may be separate castings and be bolted together.

The upper frames are each comprised of a vertically disposed back plate 15 and a vertically disposed web 16 (Figs. 1 and 17) which extends outwardly and radially of the axis of the machine from the plate 15.

At its lower end each plate 15 is provided with an inwardly and downwardly extending foot 17 which is bolted to the top flange 18 of the turret 7.

At their upper ends the plates 15 are detachably secured to the perimetral surface of a ring member 19 which rotates on the cam drum 4.

The elements 15, 16 and 19 may be hollow and have their interiors connected with each other and with the interior of the drum 4 as by the ports 20, so that air introduced to the interior of the drum through the neck 21 of the drum-lid 22 may be blown into the interiors of the castings for the purpose of cooling.

*Parison molds and assembly (Figs. 1, 2, 3 and 4)*

The parison mold and the blow or finish mold of each set are mounted on the corresponding lower frame 13—14.

23 represents vertically disposed twin supporting plates which are pivotally mounted on the outer ends of the upper and lower parallel links 24, the inner ends of which are pivotally attached on horizontal axes to the frame 13—14.

The links 24 are also pivotally connected to the vertically disposed leg 25, the lower end of which is provided with a roller 26 which travels on the annular cam track 27 mounted on the base 1 and concentric with the axis of the machine.

The track 27 is provided with suitable vertical undulations to raise and lower the plates 23 to provide the desired cycle of movement hereinafter to be described.

The leg 25 is held in proper alinement by the guide bracket 28 fixed on the web 14.

The plates 23 (Fig. 3) support between them the horizontally disposed cylindrical sleeve bearing 29 in which is rotatably mounted the journal 30 of the parison mold carrier 31. The plates 23 and the bearing 29 may be cast integrally.

Pinned or keyed in the inner end of the journal 30 is a shaft 32 which protrudes from and is concentric with the journal 30 and the bearing 29. The shaft 32 has pinned or keyed thereto at its outer end a rectangular keeper 33. Between the end of the journal 30 and the keeper 33 is a broad pinion 34, which is resiliently pressed against the end of the journal 30 by a compression spring 35 set in a recess in one end of the pinion 34. The pinion 34 is suitably splined to the shaft 32, so that parts 30, 32, 33 and 34 all rotate together. The pinion 34 is, however, of sufficient diameter, so that the uncut portion thereof overlies the joint between the journal 30 and the bearing 29, and as it is pressed against this joint by the spring 35, it will stop all leakage of air into this joint, thus insuring a good vacuum for gathering the charge.

The outer end of the journal 30 is provided with an enlarged circular head 36 to which the carrier 31 is detachably secured, as by the bolts 37, (Fig. 4).

The axis of the carrier 31 is disposed at right angles to that of the journal 30 and has at one end—the mold carrying end—a 1 bore 38 of greater diameter than the remaining bore 39.

A cylindrical stem 40 extends through the bore 39 of the carrier and is externally threaded to be screwed into a threaded portion 41 of said bore. A nut 42 is screwed onto said stem against the end of the carrier. The inner end of the stem 40 is provided with a circular head 43 located in the larger bore 38 and bearing against the annular shoulder formed between the two bores. Thus the stem is detachably secured in the carrier.

The perimetral surface of the head 43 is threaded to receive the cylindrical moldholder 44 which slidably fits the bore 38 and in which the blank mold 45 is mounted. The mold is held against excessive outward movement relative to the holder 44 by an annular lip 46 at the outer end of the latter.

The inner end of the mold 45 has attached thereto the rod 47 which extends up into the axial bore 48 of the stem 40, and 49 is an adjustment bolt screwed into the threaded upper end of said bore to impinge against the end of the rod 47 and hold the mold 45 firmly against the lip 46, a lock nut 50 being screwed up on said bolt against the end of the stem.

Thus the parison-mold is fixed in the carrier in such manner as to be readily removable as for a change of molds.

The parison-mold may be made of brush carbon or other suitable material.

The stem 40 is provided with a pair of longitudinal passages 51 and 52, the outer ends of which are plugged while their inner ends are in communication with the interior of the holder 44 in the rear of the mold 45.

The passages 51 and 52 are connected respectively by ports in the stem 40 with the annular grooves 53 and 54 in the bore of the carrier 31.

The groove 54 is connected by passages 55 in the wall of the carrier 31 and the head 36 with a concentric annular groove 56 in the end of the bearing 29, while similar passages 57 connect the groove 53 with an annular groove 58 similar to the groove 56 in the end of said bearing 29.

The groove 56 is connected through a passage 59 in the bearing 29 to a port 60 while the groove 58 is similarly connected through a passage 61 with a second port 62. Flexible pipes, not shown are connected to said ports.

Thus a current of cooling fluid, such as water, air or steam, may be passed through the stem of the mold holder, and in contact with the rear of the mold 45.

The bore 39 is provided with longitudinal grooves 63 in its walls and similarly the head 43 and the exterior wall of the mold-holder 44 are provided with longitudinal grooves 64 communicating with the grooves 63. The outer end of the bore 38 is beveled to form an annular space 65 with which the grooves 64 communicate. The inner end of the grooves 63 connect with an annular chamber 63a formed by cutting out the wall of the bore 39 and reducing the exterior diameter of the stem 40, and at one side of said chamber there is provided a valve seat 66 formed in the end of the journal 30. 67 is a valve arranged to cooperate with said seat and mounted on a stem 68, which extends through the bores of the journal 30 and the shaft 32. The protruding outer end of the valve stem 68 is provided with a washer 69 held in place by a pin. A helical spring 70 bears against the washer 69 and against the inner end of a countersunk outer portion of the bore of the shaft 32, thus tending to hold the valve 67 in its seat and to return it to its closed position. The bore of the journal 30 is provided with radially disposed ports 71 which communicate with an annular groove or enlargement 72 in the wall of the bore of the bearing 29. The groove 72 is also connected through a port 72a with a vacuum pipe 73 (Fig. 1) which is connected in turn to a vacuum manifold 74 surrounding the turret 7 and having its inner wall, which may also be the turret wall, provided with an annular series of ports 75 connecting with an annular groove in the inner wall of the turret, which groove forms with the wall of the column 3 an annular chamber 76. 77 represents a pipe extending up into the column 3 and connected to the chamber 76 through a port in the wall of the column. The pipe 77 is connected to a vacuum pump or other means for maintaining sub-atmospheric pressure. Thus when the valve 67 is open, partial vacuum or suction is applied about the mouth of the parison mold 45 so that if the lower end of said blank mold be brought into proper proximity with the molten glass, as illustrated in Figs. 1 and 3, a portion of the glass will be sucked up to fill the mold 45.

The valve 67 is opened at the proper times by means of a lever 78 pivoted at 79 on the bearing 29 and having its free end provided with a cam block 80, which when the lever is swung into its horizontal position shown at the right in Fig. 1 and also shown in Fig. 3, comes into wedging contact with the outer end of the stem 68 and forces the valve 67 open.

As the parison mold 45 approaches its lowered position, indicated at the right in Fig. 1 and also indicated in Fig. 3, the free end of the lever 78 comes into contact with a post 81, which is fixed to the frame 13—14, thus opening the valve 67. As the blank mold 45 approaches its raised position as indicated at the left in Fig. 1, the lever 78 comes into contact with a pin 82 carried by a block 83 mounted on the frame web 14, causing the lever to be thrown into its inclined position shown in dotted lines at the left in Fig. 1, thus disengaging the cam block 80 from the end of the valve stem 68 and permitting the valve to be closed by the spring 70 and thus cut off the suction.

The wall of the carrier 31 opposite the valve seat 66 is provided with a relief port 84 in which moves the cylindrical plug 85 connected to the valve 67 by means of the frame 86 which surrounds the stem 40 in the chamber 63a. The plug 85 is provided with longitudinal grooves which when the valve 67 is closed have their inner ends in communication with the chamber 65, thus permitting atmospheric pressure to be established within the carrier when the valve 67 is closed. When the valve 67 is opened, the plug 85 is forced outwardly so that the inner ends of its grooves are sealed, thus preventing the entrance of air into the chamber.

87 represents a rack block which is mounted on the side of the web 14 in the path of the pinion 34 as the mold 45 is raised and lowered, so that after the descent of the mold from its position shown at the left in Fig. 1 has begun and the neck ring has been cleared, the pinion 34 engages the rack 87, rotating the journal 30 and with it the mold carrier, thus inverting the mold before it completes its descent. Again, after the upward movement of the parison mold from its lower position shown at the right in Fig. 1 towards its raised position shown at the left in Fig. 1 has begun, the pinion 34 again engages the rack 87, reverting the mold into its upright position before it engages the neck ring.

I provide a means for retaining the parison mold against inversion at the gathering position shown at the right in Fig. 1 and also in Fig. 3, and also at the upper position when it is in engagement with the neck ring seen at the left in Fig. 1. This means comprises a block 87b (Fig. 4) having a vertical surface 87a which contacts with one side of the rectangular keeper 33 at the lower position of the suction head as seen in Figs. 1 and 4, and a block 83 adjacent to the upper position of the suction head, which is adapted to contact with the rectangular keeper 33 at its upper position and retaining it and the suction head against inversion when the latter is in contact with the neck ring. Both blocks are rigidly secured to the web 14. Intermediate the blocks 87b and 83, the head is free to be rotated by engagement of its pinion 34 with the rack segment 87.

The parison molds are each provided with a lid which is arranged to partially close the mouth of the inverted mold when the latter is brought into suction-feed relation with the supply of molten glass as illustrated in Figs. 3 and 4 and at the right in Fig. 1.

In these figures the lid is of a partible type comprising two halves or portions 88 which are carried by levers 89 pivoted on the shafts 90 which extend through holes in the carrier 31. The levers 89 are provided with arms 91, the adjacent ends of which are provided with holes through which pass a common pivot bolt 92 carrying a roller 93. The bolt hole in one of the arms is slotted as shown in Fig. 4 to provide for the necessary lost motion. The roller 93 engages a cam track 94 which may be cast integral with the sleeve 29, and said cam track is given such contour that when the carrier is turned to invert the mold 45, the lids 88 are brought into their closed position.

The lids when closed provide a reduced feed opening 95 for the mouth of the mold and assist in the suction filling of the mold with the molten glass.

As shown at the right in Fig. 1 and also as shown in Fig. 3, 96 represents a portion of a glass furnace in which is maintained a body of molten glass. 97 is an annular apron or cover plate which moves with the turret and is supported therefrom as by the brackets 98 bolted to the webs 14 (Fig. 4). At each mold position the apron is provided with an opening 99 through which the inverted parison mold 45 is lowered at the proper time into suction-feed relation with the glass in the furnace 96. The parison molds are inverted and their lids 88 closed before they descend into the apertures 99, and the molds are raised from said apertures before they are reverted and their lids opened.

For opening the lid at the upper position of the parison mold, I provide a bracket member 100, which is adapted to contact with the hook 101 (Fig. 4) rigid with one of the lid members 88, motion being imparted to the other lid member through the levers 91 above described. Thus, the lids 88 will be opened by the upward movement of the parison mold 45 to a position in engagement with the neck ring and will be fully opened at such engaging position, and the lids will be closed by the action of the cam 94 cooperating with the roller 93 as the suction head is reverted in its downward movement to its position for gathering as shown in Fig. 3.

The shears

Each unit is provided with shear means for cutting the neck of glass which connects the mold charge sucked up into the inverted parison mold and the glass in the tank 96.

These shears are preferably of the pivotally connected blade type indicated at 102 in Figs. 2 and 5. Thus 103 represents a horizontally disposed lever keyed on the lower end of a shaft 104 journaled in the bearing 105 carried by the web 14.

The free end of the lever 103 has mounted thereon the flat plate 106 having its rear edge provided with an abutment flange 107.

Pivotally mounted on the lever 103 is a secondary lever 108, the free end of which carries the shear supporting plate 109 which slides over the plate 106 and has interposed between its downwardly flanged rear edge and the flange 107 the springs 110 which tend to throw the plate 109 forwardly relative to the plate 106.

The shear blades 102 are pivoted to and beneath the plate 109 on a pin 111 which pin protrudes above the plate 109.

The sides of the blades 102 are provided with the notches 112 which are engaged by pins 113 extending upwardly from the plate 106, the notches being inclined so that when the plate 109 is forced toward the abutment 107, the shear blades will close together but as such force is relieved the springs 110 will cause the blades to open.

A stop 114 is mounted on the lower portion of the web 14, which stop, when the lever 103 is swung clockwise in Figs. 2 and 5, as will hereafter appear, is engaged by the pivot pin 111, causing the blades to close beneath the orifice of the parison mold, shearing the neck of glass.

115, 116 and 117 represent three vertically disposed shafts arranged in nested relation and journaled in the bearing 118 carried by the frame web 14.

The lower end of the central shaft 115 is extended downwardly and provided with a radially disposed lever 119 (Figs. 1, 2 and 4) which is connected by a link 120 with the lever 103. A spring 121 connects the lever 119 with a point fixed relative to the frame web 14, which spring tends to swing the levers 119 and 103 clockwise in Figs. 2 and 5, thus causing the shears to close beneath the inverted blank mold.

The upper end of the shaft 115 is provided with a radially disposed lever 122 having at its outer end a roller which is held in contact with the edge of the cam plate 6a carried by the cam drum 4. The tension of the spring 121 holds the roller in engagement with the cam plate 6a and tends to hold the levers 103 and 119 in their retracted positions shown in Fig. 2 and the shears open.

The cam plate 6a is provided with a depression or valley 123 which is so located, as indicated in Fig. 2, that after an inverted blank mold has been charged by suction and before it passes from above the tank 96, the roller of the corresponding lever 122 engages the valley 123, thus permitting the spring 121 to swing the lever 103 clockwise to position and close the shears beneath the blank mold. As the roller passes beyond the valley, the lever 103 is retracted counterclockwise in Fig. 2 and the shears open, the shears remaining open and retracted until the next charge is sucked into the inverted parison mold.

*Blow molds and assemblage (Figs. 1 and 2)*

Each unit of the machine includes a blow or finishing mold comprising the mold parts or halves 124. The parts are provided with hinge arms 125 engaged by the vertical pintle 126 rising from the platform 127 which is carried by an arm 128 pivotally mounted on a vertical axis on the outer end of a bracket 129 extending from the frame-web 14.

A crank 130 extends from the side of the arm 128 and has pivotally connected thereto as by means of a vertical pintle pin 131 the sleeve member 132 through which extends the link 133, the outer end of which is provided with adjustable limiting nuts. The inner end of the link 133 is connected to a crank arm 134 of a collar 135 pinned on the lower end of the intermediate sleeve 116. A spring 136 is coiled about the link 133 between a collar fixed on said link and the end of the sleeve member 132. The upper end of the sleeve 116 has pinned thereon the collar 137 having opposed levers 138 provided with rollers which engage the cam plates 6b and 6c, respectively. Said cam plates are so arranged that at the proper time the arm 128 is swung in one direction, clockwise in Fig. 2, to position the blow mold under the blowing head, and then, after the blowing operation has been completed, to swing the arm 128 counterclockwise to retract the blow mold from under the blow head. The mechanisms for opening and closing the blow molds are substantially similar to those shown in the copending patent application of Robert W. Canfield, Serial No. 320,109, filed Nov. 17, 1928, and are as follows:

The blow mold parts are opened and closed by means of the actuating member 139 which is shifted by means of a crank 140 provided with a pivotally connected sleeve 141 through which extends the link 142 having its outer end provided with adjustable limiting nuts 143. A spring 144 is coiled about the link between a shoulder near its inner end and the inner end of the sleeve 141. The inner end of the link 142 is pivotally connected to one arm of a bell-crank lever 145 pivotally mounted on the pintle 131, while the other arm of said bell-crank lever is connected by a link 146 with a crank arm 147 of a collar 148 pinned on the lower end of the outer shaft 117.

The upper end of the shaft 117 has pinned thereon a collar 149 provided with the two levers 150 provided at their outer ends with rollers which engage the opposed cam plates 6d and 6e.

The arrangement of the parts and the shape of the cam plates are such that as the mold is moved into position beneath the blow head, the mold parts are closed together, and before the mold has been retracted from beneath the blow head it is opened.

*Neck rings and assemblage (Figs. 1, 2, 6, 7, 8, 9, 10, 11, 12, and 13)*

Two neck rings are provided for each unit, the same being mounted on a neck ring platform 151 which is a hollow casting, generally oblong in shape and which is provided with a central circular opening in which the lower end of a vertically disposed tubular shaft 152 (Fig. 11) is pinned as at 153.

The shaft 152 is journaled in a sleeve bearing 154 which may be integral with the frame web 16. The wall of the shaft 152 is provided with elongated ports 152a in its upper and lower ends, so that the cooling air or other fluid may flow from the interior of the frame web 16 through the shaft and into the interior of the platform 151, thus preventing overheating of the neck rings.

At the upper end of the bearing 154 the shaft 152 is diametrically enlarged and has secured thereon the disk 155 (Figs. 6, 7 and 9) which rests on the upper end of said bearing. Above the disk 155 and fixed relatively thereto is a disk 156 of larger diameter, the perimetral surface of which is employed as a brake drum which is encircled by the brake band 157, the free end of which is provided with a pierced ear 158 through which and through a fixed ear 158a extends the link 159 having an adjustable abutment nut on its outer end and a spring 160 coiled about the link between the ears. The left hand ear 158a, as seen in Fig. 8, is formed rigid with a suitable bracket secured to the frame web 16.

The inner end of the link 159 is pivotally connected to a crank arm 161 of a sleeve 162 rotatably mounted on a vertically disposed pivot shaft 163, the ends of which are secured in brackets 164 on the rear face of the frame member 15.

The sleeve 162 is provided with a second crank arm 165 carrying a roller which engages a cam-plate 6f on the drum 4, which cam plate has its perimetral surface so contoured as to tighten and loosen the brake band 157 on the disk 156 at the proper intervals. This prevents spinning of shaft 152.

A ratchet disk 166 (Figs. 8 and 9) is loosely mounted on the shaft 152 above the disk 156, said ratchet disk being provided with a pair of diametrically opposed shoulders 167 which face clockwise, said shoulders being arranged for engagement by a pawl 168 pivotally mounted on the disk 156 and held against the perimeter of the disk 166 by a spring 169.

A pinion 170 is loosely mounted on the shaft 152 above the disk 166, said pinion being fixed to said disk, as by a bolt 171. A cap 172 is clamped on the upper end of the shaft 152 to hold the parts in assemblage.

173 represents a segmental gear in mesh with the pinion 170 and mounted on the outer end of a lever 174 which is pivoted on the shaft 163 and is provided with a pair of arms 175 provided at their outer ends with rollers which engage the complementary cam plates 6g, the perimetral contours of which are such as to oscillate the lever 174 and its segmental gear 173 at the proper times.

It is evident that when the segmental gear 173 rotates the pinion 170 clockwise in Figs. 2 and 6, the shaft 152 is rotated 180 degrees, but when it rotates the pinion counterclockwise the pawl 168 trails over the perimeter of the ratchet disk 166 and the shaft 152 is idle.

The perimeter of the disk 155 is provided at properly positioned and diametrically opposed points with a pair of notches 176 which are arranged to be engaged by the locking bolt 177 slidable in a casing 178 on the frame member 16. The bolt is resiliently urged into engagement with the disk 155 by a spring 179. The bolt is retracted at proper intervals by means of a link 180 which connects the rear end of the bolt to a crank 181 on a rock shaft 182 journaled in a bearing 183 on the frame web 16. The other end of the shaft 182 is provided with a crank 184 which in turn is connected by a link 185 with a crank arm 186 on the sleeve 187 rotatably mounted on the shaft 163. The sleeve 187 is also provided with a second arm bearing a roller which engages a cam plate 6h at the proper intervals to retract the bolt and thus unlock the neck ring platform so that it may be rotated a half-turn.

The neck-ring platform 151 is provided with a pair of annular openings 188 (Figs. 11 and 13) symmetrically arranged on opposite sides of the axis of movement, which openings are provided at their upper ends with raceways for the anti-friction balls 189 upon which the annular neck-ring carriers 190 are mounted to rotate. The carriers are held in their seats by means of clips 191 secured to the platform and engaging perimetrally arranged grooves on the carriers.

The openings in the bottom wall of the platform are of greater diameter than in the top wall, and may be provided with the detachably mounted edge rings 192, the bores of which are of proper diameter to permit the upward insertion of the top of the reverted blank mold.

The carrier rings 190 are each provided with two pairs of opposed pierced ears 193 which pivotally support the neck ring levers 194 on the lower ends of which are detachably mounted, as by bolts, the halves or parts 195 of the partible neck rings.

The lower perimetral edges of the neck rings are beveled as shown at 196 so that the engagement therewith of the complementary beveled upper end of the parison mold support forming the outer wall of the chamber 65 (Fig. 3) will force and hold the neck rings tightly closed.

It will be understood that the proper type of neck rings to suit the character of ware to be fabricated on the machine will be installed on the machine.

An annular cover 197 is movably mounted above each neck ring, said covers being hinged as at 198 to the platform 151 and being normally held elevated, as shown in Figs. 11, 12 and 13, by means of the compression springs 198a which are set in suitable bores in the platform 151 and bear against the covers 197.

The covers 197 are provided on their upper faces with the cam tracks 199 which are in turn engaged from above by the roller 200 mounted on the outer end of the frame web 16 as the platform 151 is intermittently rotated.

When the neck ring parts 195 close together, a pair of notched latches 201 pivotally mounted on one of the semi-annular neck ring levers 194 drops into engagement with pins 202 on the other holder, thus locking the neck ring closed against accidental opening. When the cover 197 is depressed, the pins 203, which are slidably mounted in suitable sleeves 204 rigid with the carrier 190, are forced downwardly against the tails of said latches, thus disengaging their notches from the pins 202 and thus unlocking the neck rings so that the further descent of the cover may force the neck ring wide open to release the finished ware by contact between the shoulders 203a (Fig. 12) of the pins 203 with the holders 194.

The latches 201 are extended forwardly a sufficient distance so that they will always be above or in engagement with the pins 202, even when the neck ring halves are in their full open position. Leaf springs 205 are fastened to one of the neck ring holder levers 194 and extend over the other, so that motion is transmitted from one of the neck ring halves to the other in opening the neck ring, the motions being imparted to one of the halves, as above stated, by the downward movement of the pins 203 caused by the downward movement of the covers 197 in riding under the roller 200 and against the action of the compression springs 198a. Upward movement of the covers 197 under the action of the springs 198a is stopped at a desired point by the set screws 206 threaded through the rearwardly extending lugs on the covers 197 and bearing against suitable projecting portions of the platform 151, these set screws being locked in adjusted position by jam nuts threaded thereon and bearing against the rearwardly extending portions of the covers 197 (Figs. 10 and 13). Closing movement of the neck ring is effected by the upward movement of the blank mold, which contacts with the bottoms of the neck ring halves and forces them together, moving the pins 203 upwardly and permitting the latches 201 to drop over the pins 202 and lock the neck ring halves in closed position, the latches being engaged with the pins 202 by their own weight.

*The press heads for forming the parisons (Figs. 1, 2, 11, 14, 15, 17 and 18)*

Each of the units of the machine is provided with a parison-forming press head which is illustrated as of the following construction. On the front side, that is in the direction of the unit's movement the frame-web 16 is provided with a pair of vertically disposed guides 207 (Figs. 10, 14 and 15) in which is slidably mounted the back plate 208 of the press head support. Extending forwardly from the plate 208 are the upper and lower annular shelves 209 and 210. At one side, the left side in Fig. 15, the shelves are connected by a pair of parallel struts 211. The back plate, shelves and struts are preferably a unitary, cast structure.

The upper shelf 209 is recessed to form a cup in which is mounted the anti-friction bearing 212 and the lower shelf is of inverted cup form to receive the anti-friction bearing 213. A sleeve 214 extends through said bearings and is thus rotatable therein. The sleeve is prevented from downward movement relative to the shelves by means of the split clamping nut 215 which is screwed onto the threaded exterior of the sleeve above the bearing 212, a shield 216 being held below the nut to prevent the entrance of dirt into the bearing. The shoulder 217 of the sleeve prevents upward movement of the latter relative to the shelf 210. A shield 218 protects the bearing 213 from below.

A hollow stem 219 is vertically slidable in the bore of the sleeve 214, the lower end of the stem having detachably mounted thereon the pressing plunger 220.

The pressing plunger is slidable in a cylindrical barrel 221 provided with a tubular neck, which is threaded and screwed up into an enlarged and internally threaded portion of the bore of the sleeve 214.

A stripper sleeve 222 surrounds the barrel 221 and is slidable thereon, the sleeve having an inturned flange at its upper end which encircles the neck of the barrel. The lower end of the sleeve 214 is provided with a depending annular guide 223 which holds the stripper sleeve in proper alinement.

The wall of the enlarged lower end of the sleeve 214 is provided with one or more vertical bores in which are slidably mounted the rods 224 (Figs. 11 and 16), the lower ends of which impinge on the top flange of the stripper sleeve 222, and the upper ends of which are secured to a spiral pinion 225 (Fig. 16), which is splined or otherwise mounted on the sleeve 214 so as to be slidable on the latter but to rotate in unison therewith.

The pinion is resiliently depressed relative to the sleeve 214 by means of the spring 226 coiled about the sleeve 214 between the pinion and a split clamping nut 227 on a threaded portion of the sleeve.

Within the stem 219 is a pipe 228 of small enough diameter to provide an annular passage between the pipe and the stem, and within the hollow of the plunger 220 the bore of the pipe and said annular passage are in communication.

Near its upper end the stem 219 is provided with a reduced portion or neck 229 and a chambered head-block 230 is mounted on the upper end of said stem and has a lip which engages the neck 229, the head block 230 being held in place by a front plate 231 held in place by a cap screw. The upper end of the pipe 228 communicates with a central chamber in the block 230 and air or other cooling fluid is supplied to said chamber by means of a pipe 232. The upper end of the stem 219 is provided with radially disposed ports 233 so that the fluid after circulating down the stem and within the plunger may escape to atmosphere around the plate 231. A spring 234 connects the pipe 232 with a fixed point on the frame web 16 and tends to elevate the plunger.

A horizontally disposed shaft 235 is journaled in bearings in the struts 211 and has its ends protruding beyond said bearings. Twin links 236 connect the shaft 235 to the outer end of a lever 237, the inner end of which is connected to a crank 238 (Fig. 1) on a shaft 239 journaled in the bracket 164. The other end of the shaft 239 has fixed thereon a lever 240 from the outer end of which a spring 241 extends downwardly to a fixed point on the back plate 15.

Intermediate of its length the lever 237 is connected by the lever 242 to the lower end of a lever 243, the upper end of which is pivotally connected to a bracket 244 mounted on the back plate 15.

The lever 243 has a block 245 pivotally mounted thereon on a horizontal axis intermediate of the lever length and pivoted to said block on a vertical axis is a second block 246 which has adjustably screwed therein one end of a rod 247, the other end of which is pivotally connected on an eccentric vertical axis to a sleeve 248 on the shaft 163. The sleeve 248 is provided with arms 249 and 250 carrying rollers which engage the cam plate 6i and 6j, respectively, said cam plates being arranged to raise and lower the back plate 208 at the proper intervals.

In the event that the plunger should contact with the glass and its motion be interrupted so that breakage might occur, the linkage above described is arranged to yield. The yielding action of this linkage is as follows: the toggle formed by levers 243 and 242 (Fig. 1) will be positively straightened out by the cams 6i and 6j acting through the rollers and the lever mechanism above described, which will force downwardly the point of connection between levers 242 and 237. As the right hand end of the lever 237 as seen at Fig. 1 cannot be moved downwardly due to the press head having met an obstruction, the left hand end of the lever 237 will be moved downwardly, rotating the crank 238 and the lever 240 in a counter-clockwise direction about the pivot 239 and extending the tension spring 241. Thus, I have provided an arrangement such that the downward movement of the plunger is resilient and yet is controlled by a positive cam and a toggle so that the necessary force may be imparted to the press head in pressing the parison, the limit of this force being dependent upon the tension of the spring 241.

251 (Fig. 15) represents a bracket mounted on the back plate 208 and having pivotally mounted thereon the stop latch 252 which is resiliently held in the path of the block 230 by the spring 253 (Fig. 16).

It is evident that when the latch 252 is in place, the pressing plunger 220 is held depressed relatively to the sleeve 214.

To retract the latch a rod 254 is slidably mounted in guides on the web plate 16, one of which guides is shown at 255, at the proper elevation to be horizontally aligned with the angular tail of the latch 252 when the pressing head and the plunger are both depressed. The inner end of said rod is pivoted eccentrically to a rocker sleeve on the shaft 163, which sleeve carries a roller which engages a cam plate 6k, (Fig. 1). The cam plate 6k is arranged to force the rod 254 outwardly when the blank-pressing operation is completed, thus retracting the latch and permitting the spring 234 to retract the plunger 220 upwardly within the barrel 221.

The rod 254, Figs. 14 and 15, is urged to the left as seen in these figures by a suitable compression spring 254a coiled about the rod and extending between the guide 255 and a suitable collar secured to the rod, this spring thus serving to hold the roller in engagement with its operating cam 6k.

As the press head is elevated the block 230 strikes the adjustable stop 256, which halts the ascent of the stem 219 and the plunger 220 before the press head reaches its raised position, thus permitting the spring actuated latch 252 to move about the block 230 and thereby again setting the plunger in its depressed position relative to its barrel 221.

257 represents a bifurcated lever keyed on the shaft 235 and straddling the sleeve 214 and the spring 226 to bear on the pinion 225. The shaft has also keyed on its inner end the crank arm 258 carrying a roller 258a which is in the path of a cam block 259 on one of the guides 207. The cam block is so located and proportioned, that as the press head starts to rise, after a blank-pressing operation, the lever 257 is swung downwardly, thus depressing the pinion 225 relative to the sleeve 214, which in turn momentarily prevents the ascent of the stripper sleeve 222, thus holding the parison in the mold and preventing it following the press head and the plunger.

The cam drum 4 has mounted thereon the stationary ring gear 260, (Fig. 1) and each of the units of the machine is provided with a pinion 261, (Figs. 17 and 18), meshing with the ring gear and mounted on a horizontal shaft 262, which is journaled in bearings depending from the frame-web 16. A second shaft 263 is connected to the outer end of the shaft 262 by a universal joint 264, and said second shaft is journaled in a sleeve bearing 265 carried by a yoke 266 which is hinged to swing on a vertical axis. A lever 267 is fixed to said yoke and connected to a link 268 which extends through an enlarged opening in the bracket 269 carried by the back plate 15. The inner end of the link 268 is connected to a crank 270 of a sleeve 271 rotatably mounted on a vertical shaft 272 supported by a bracket 273 from the back plate 15. The sleeve 271 is provided with an arm 274 carrying a roller arranged to be engaged by the cam plate 6l. The spring 275 is coiled about the link 268 between the bracket 269 and a washer 276 fixed on the link and tends to resiliently hold the shaft 263 in alinement with the shaft 262 and to return the first named shaft to such alinement, while the periodic engagement of the roller with the cam plate 6l causes the shaft 263 to be swung, counterclockwise in Fig. 17, out of such alinement.

When the press head is depressed and the pressing plunger 220 elevated for blowing a blank, the shaft 263 is swung into alinement with the shaft 262 and a spiral pinion 277 mounted on the outer end of the shaft 263 is thus brought into mesh with the pinion 225 of the press head, thus causing the sleeve 214 to be rotated.

The insertion of the stripper sleeve 222 into the upper end of the neck ring (Fig. 11) and the wedging of the beveled lower portion of the guide 223 down into engagement with the upper tapered ends of levers 194 which carry the neck ring parts produce a frictional engagement between the rotating press head and the neck ring which results in the rotation of the blank during the puff blowing operation which follows the pressing of the blank or parison, the neck ring being stationary during the pressing operation as the pinion 277 is held out of engagement with the pinion 225 at this time by the cam 6l.

Simultaneously with or shortly after the parison mold 45 begins its next descent, the pressing plunger 220 is raised with respect to the barrel 221 and puff blowing air is supplied to the parison to effect its elongation and assist the action of gravity in producing a parison form which may be substantially as shown at the right in Fig. 11. For this purpose I provide on the sleeve member 214 an annular member 214a (Fig. 16) which does not rotate but is vertically slidably mounted in the shelf member 209 and is pressed down against the shoulder 214b of the member 214 by a suitable compression spring 214c extending between an enlarged portion of the member 214a and the under side of the shelf 209. Air is admitted to the member 214a through a suitable nipple 214d and flows thence through the annular space in this member, through a suitable bore seen at the left in Fig. 16, downwardly through the annular space 214e between the member 219 and the sleeve 214 and thence along the longitudinal grooves 221a formed in the inside of the member 221 and around the plunger to the parison, these grooves terminate above the bottom of the member 221 so that no openings are provided into which glass may be forced during the pressing operation. The puff blowing air is derived from any suitable source, but I prefer to use a structure such as is shown in the copending application of R. W. Canfield, Serial No. 320,109, filed November 17, 1928, this construction however not being shown in the present case, as it forms no part of the present invention.

When the desired elongation of the parison has been effected, the shaft 263 and the pinion 277 are swung aside, the press head is then raised by the action of the cams 6i and 6j, through the toggle mechanism described above which raises the slide 208 in the guide 207, and the neck ring platform 151 is then indexed 180° by the action of the cam 6g through the segmental gear 173 shown in Fig. 6, bringing the neck ring with the parison therein below the blow head presently to be described. During the elongation and puff blowing of the parison, it may be desirable to reheat the parison to some extent and to constrict the upper portion thereof, and for this reason I have provided a reheating burner and necking tool for the same purpose as that described in a similar connection in the Canfield application, above referred to, these parts will be described later in detail.

*Blow head and assembly (Figs. 1, 2, 6, 11, 17, 18 and 19)*

Each web-plate 16, on its side opposite the guides 207 is provided with vertically alined upper and lower sleeve bearings 278 and 279 (Figs. 7, 17, 18 and 19). The lower bearing is duplex or interrupted as illustrated in Fig. 19.

The blow stem 280 is mounted in said bearings for both rotary and vertical movement.

A pinion 281 occupies the interruption in the lower bearing 279 and is splined on the stem 280, so that the stem will rotate with the pinion and also slide independently thereof.

282 represents a segmental gear formed on the swing-plate 283 which is pivotally mounted on a pin 284 supported in a socket 285 formed on the end of the web plate 16. The plate 283 is connected by a link 286 to the upper end of the lever 287, the lower end of which is pivoted to a bracket 288 mounted on the back plate 15. Intermediate of its length the lever 287 is provided with a contact roller 289 which engages a cam slot in a sleeve 290 mounted on the shaft 262, so that as said shaft revolves, the stem 280 is rotated alternately in opposite directions.

The stem 280 (Figs. 1 and 7) is provided with a neck or portion of reduced diameter which is encircled by a split collar 291 rotatable with respect to said stem and provided with diametrically opposed trunnions 292 which are journaled in slots in the forked outer end of a bell crank lever 293, the intermediate portion of which is pivotally mounted on a pin carried by the web-plate 16 and the inner end of which is connected by a link 294 to a crank on a sleeve 295 on the shaft 163. The sleeve 295 is provided with levers 296 and 297 having rollers on their outer ends. The rollers respectively come into periodical engagement with the cam plates $6m$ and $6n$, which are arranged to raise and lower the stem 280 at the proper times.

The lower end of the stem 280 (Figs. 11 and 19) is of reduced diameter forming the circumferential shoulder against which is fixed the annular closure plate 298. Slidably mounted on the lower end of the stem 280 is the conical head member 299. The member 299 is prevented from disengagement from the stem as by the screws 300 and is pressed downwardly by the spring 301. The plate 298 and the member 299 are held from rotation relative to the stem 280 by the key 302.

When the blow head is lowered into the neck ring the member 299 is inserted downwardly into the upper end of the parison 303 which is suspended by the neck ring in the blowing position, the member 299 being vertically ribbed or fluted to give frictional engagement, while the plate 298 which has a tapered perimetral surface wedges downwardly between the neck-ring levers 194. Thus the rotary movements of the blow head in opposite directions are imparted to the blank within the blow mold during the blowing operation.

The stem 280 is closed at its upper end, and a lateral bore $280a$ is provided communicating between the outside of the stem 280 and the longitudinal bore $280b$. At the lower position of the stem 280, the lateral bore $280a$ is positioned opposite the annular space $278a$ within the bearing 278 (Fig. 7). Final blowing air is supplied to the annular space $278a$ through the pipe 304 from any suitable source of air at the desired pressure, this supply being preferably of the type shown in the Canfield application above referred to and being controlled by similar mechanism. Inasmuch as this feature also forms no part of the present invention, it will not be further described in detail.

*Necking tool and operation thereof (Figs. 1, 2, and 17)*

In many cases it is necessary to "neck" or constrict the upper end of the parison before it is delivered to the blow mold. For this purpose a necking tool is provided.

The tool 305, which may be of blade form, is adjustably mounted on the lever 306 which is pivotally mounted on a pin 307 supported from the frame web 16, the adjustment being shown as effected by enlarging the bolt holes $305a$ in Fig. 17. Intermediate of its length the lever 306 is connected by a link 308 with an arm 309 carried by a sleeve 310 rotatably mounted on a vertical shaft 311 extending upwardly from a bracket mounted on the rear of the plate 15. The arm 309 is provided with a roller which is arranged to engage a cam-plate $6o$. The collar has a second arm 312 connected by the spring 313 with the plate 15. Thus the contact of the roller with the cam plate tends to swing the edge of the tool 305 into contact with the neck of the parison during its elongation due to gravity and the puff blowing as above described, and after the roller has passed from contact with the cam plate, the tool 305 is retracted out of the way by the spring 313, the spring also serving to urge the roller at all times toward the cam plate.

*The reheating burner and its operation (Figs. 1, 2 and 17)*

Means are provided for reheating and controlling the shape of the parison while it is suspended from the neck ring after the removal of the parison from the parison mold.

Thus 314 represents a lever pivotally mounted on the pin 307 and having its free end provided with a depending shelf 315 which carries a burner 316 to which a combustible fluid, such as a mixture of gas and air, is supplied by any convenient means. Intermediate of its ends the lever 314 is connected by a link 317 to an arm 318 mounted on a collar 319 rotatably mounted on the shaft 311. The arm 318 is provided with a roller which engages a cam plate $6p$. The engagement of the cam plate by the roller causes the burner to be swung under the naked parison suspended from the neck ring, thus reheating the parison and also controlling its elongation by gravity. The collar 319 is provided with a second arm connected by a spring 320 with the plate 15, so that as the roller passes beyond the cam plate, the burner is retracted out of the way.

In the operation of the machine, as illustrated diagrammatically in Fig. 20 of the drawings, the units travel clockwise and continuously about the axis of the machine and successively pass the gathering zone with the suction parison mold inverted and extending downwardly through the corresponding aperture 99 in the apron 97, the lids 88 being in their closed position as shown in Figs. 3 and 4.

As the mold passes over the glass container the lid dips into the glass and suction is applied which draws a charge of glass into the cavity formed by the mold and the lid. The parison mold is then elevated somewhat and the mold charge is severed from the supply of glass by the shears. The ascent of the parison mold continues and it is reverted by the rack 87 and positively positioned below and in engagement with one of the neck rings. The press head with its pressing plunger 220 in its lowermost position, now descends and presses the gathered glass and forces the now upper portion of it into the neck ring.

It is to be noted that each gathering operation provides a charge consisting of two portions, the first, marked 321, Fig. 3, is within the parison mold proper, and the second, marked 322, is that laterally defined by the opening in the lid.

In the use of my machine in the manufacture of electric light bulbs, tumblers and the like, the first of these portions, 321, is destined to form the ultimate article, while the second portion, 322, forms a neck or connection useful during the formation of the article but ultimately cracked off or otherwise detached, forming no part of the ultimate article. It is this second portion 322 only which is disturbed appreciably by the pressing operation, it being forced by the pressing plunger into the space between the plunger and the edges of the neck ring. The first or body portion, 321, of the charge while compacted to some extent by the pressing operation is not normally displaced to an extent which will cause appreciable relative movement between its outer surface and the interior wall of the parison mold proper. It is readily seen that these provisions and this mode of operation permits accurate control of the extent and character of chilling of the body portion of the parison. This chilling is thus rendered uniform and results in a final article in which the distribution of glass is superior to that generally obtained with machines of the prior art.

This method of operation is peculiarly adapted to the formation of electric light bulbs and similar articles, tumblers and the like. It is obvious that the neck ring may be employed to form the "finish" which may be a permanent part of the completed article as when my inventions are employed in the manufacture of bottles.

After the pressing operation the parison mold descends and is again inverted preparatory to receiving its next mold charge, leaving the naked parison suspended from the neck ring. Thereafter the parison while suspended from the neck ring is shaped to suit the conformation of the blow mold.

The details of the shaping operations are subject to variation in accordance with the articles to be made, and may comprise puff-blowing and elongation by gravity, reheating and shaping by the dynamic force of the heating burner, spinning, and/or necking by the use of the tool shown at 305. Methods which may be employed are fully described in the patent applications of Robert W. Canfield, Serial No. 31,315, fiiled May 19, 1925, now Patent No. 1,756,813 issued April 29, 1930, and Serial No. 320,109, filed November 17, 1928.

During such parison shaping operations the neck ring and parison may be spun by means of the frictional engagement between the ring and the rotating press head. The pressing plunger is of course retracted within the press head after the pressing operation and the puff and other blowing which may be employed to assist in shaping the parison supplied through the head by means already described.

When the parison has been suitably shaped the neck ring carrier is rotated 180° in a clockwise direction to bring the neck ring from which the parison is suspended into suitable relation with the blow mold which is now moved into position and closed about the parison. The blow head now descends into engagement with the neck ring and the parison is blown to final form in the blow mold, the intermittent rotation of the blow head causing relative movement between the parison and the blow mold as the former is being expanded in the latter. The blow head is now raised and the blow mold is opened and swung to one side, leaving the finished article suspended from the neck ring.

The neck ring platform is then rotated 180° in a clockwise direction to carry the neck ring in question back to its parison forming position. As the neck ring passes under the roller 200 the latter by its engagement with the cam track 199 of the cover 197 opens the neck ring and releases the finished article which is carried away by suitable means not shown.

The above described operation of my device proceeds during two complete rotations of the unit in question about the axis of the machine. During the one complete rotation the parison is gathered and shaped and during the next rotation that parison is blown to final form and is removed from the blow mold. During the second rotation the other neck ring receives a charge as above described, which charge is pressed and shaped into a parison and made ready to be transferred for its final blowing operation at the end of the second rotation. By this arrangement of parts and method of operation I greatly increase the rate of production of machines of this character as is obvious from the cycle above described.

It is to be observed that each suction parison mold 31 travels in a circular path of materially shorter diameter than does the corresponding blow mold 124. This difference in path diameters may be emphasized by rearrangement of the structure. In the arrangement shown the linear speed of movement of the suction mold is materially less than that of the blow mold. This arrangement presents peculiar and novel advantages over the prior art in that it permits the machine to be operated at greatly increased speed while assuring ample time for the suction gathering operation.

The cycle above described and illustrated in Fig. 20 may be varied in many respects as to the time employed in the several operations and my invention is not to be limited to the particular cycle there shown. Obviously the particular mechanisms illustrated and described may be modified and the mechanisms disclosed in the said patent applications of Canfield and in the prior art may be substituted in the combination of structure and the practice of method of my invention.

What I desire to claim is:—

1. In a press and blow machine for forming articles of glassware, the combination of a rotary support, a press and blow mechanism mounted on said support and comprising a press mold, means for pressing a mold charge therein, a blow mold, means for blowing the parison formed from said mold charge to final form in said blow mold, a neck-ring device from which said parison is suspended and by which it is transferred to the blow mold, and means for timing the occurrences of the several operations to cause a parison to be formed during one revolution of the support and said parison to be expanded to final form during the next revolution thereof.

2. In a press and blow machine for forming articles of glassware, the combination of a rotary support, a press and blow mechanism mounted on said support and comprising a press mold, means for pressing a mold charge therein, a blow mold, means for blowing the parison formed from said mold charge to final form in said blow mold, a neck-ring device from which said parison is suspended and by which it is transferred to the blow mold, and means for timing the several operations to cause during each revolution of the support a parison to be formed and the parison formed during the previous revolution of the support to be blown to final form.

3. In a press and blow machine for forming articles of glassware, the combination of a rotary support, a plurality of press and blow units mounted on said support, each unit comprising a press mold, means for pressing a mold charge in said press mold, a blow mold, means for blowing the parison formed from said mold charge to final form in said blow mold, a neck-ring device from which said parison is suspended and by which it is transferred to the blow mold, and means for timing the operations of said units to cause a parison to be formed by each unit during each revolution of the support and said parisons to be blown to final form respectively during the next revolution of said support.

4. In a press and blow machine for forming articles of glassware, the combination of a rotary support, a press and blow mechanism mounted on said support and comprising a press mold, means for pressing a mold charge therein, a blow mold, means for blowing the parison formed from said mold charge to final form in said blow mold, a rotatable carrier, a pair of neck-rings mounted on said carrier and arranged to be brought alternately into cooperative relation with said press mold and said blow mold, means for timing the several operations to cause during each revolution of the support a parison to be formed and suspended from one of the neck-rings and the previously formed parison to be blown to final form in said blow mold while suspended from the other neck-ring, and means for rotating the neck-ring by which the parison is suspended with respect to said carrier about a substantially vertical axis.

5. In a press and blow machine for forming articles of glassware, the combination of a rotary support, a press and blow mechanism mounted on said support and comprising a press mold, means for pressing a mold charge therein, a blow mold, means for blowing the parison formed from said mold charge to final form in said blow mold, a rotatable carrier, a pair of neck-rings mounted on said carrier and arranged to be brought alternately into cooperative relation with said press mold and said blow mold, means for timing the several operations to cause during each revolution of the support a parison to be formed and suspended from one of the neck-rings and the previously formed parison to be blown to final form in said blow mold while suspended from the other neck-ring, and automatic means for imparting to the parison a rotative movement while it is being blown to final form in said blow mold.

6. In a press and blow machine for forming articles of glassware, the combination of a rotary support, a press and blow mechanism mounted on said support and comprising a press mold, means for pressing a mold charge therein, a blow mold, means for blowing the parison formed from said mold charge to final form in said blow mold, a rotatable carrier, a pair of neck-rings mounted on said carrier and arranged to be brought alternately into cooperative relation with said press mold and said blow mold, means for timing the several operations to cause during each revolution of the support a parison to be formed and suspended from one of said neck-rings and the previously formed parison to be blown to final form in the blow mold while suspended from the other neck-ring, and automatic means for independently imparting rotative movement to said neck-rings about their respective axes.

7. In a press and blow machine for forming articles of glassware, the combination of a rotary support, a press and blow mechanism mounted on said support and comprising a press mold, means for pressing a mold charge therein, a blow mold, means for blowing the parison formed from said mold charge to final form in said blow mold, a pair of neck-rings from one of which the parison is suspended and by which it is transferred to the blow mold, means for timing the several operations to cause during each revolution of the support a parison to be formed in one of said neck-rings and during the next revolution the parison thus formed to be blown to final form, and means to release each finished article during the movement of the neck-ring in which it is held away from the blow mold back toward a position in cooperation with said press mold.

8. In a press and blow machine for forming articles of glassware, the combination of a rotary support, a press and blow mechanism mounted on said support and comprising a press mold, means for pressing a mold charge therein, a blow mold, means for blowing the parison formed from said mold charge to final form in said blow mold, a neck-ring device including a pair of neck-rings from one of which the parison is suspended and by which it is transferred to the blow mold, means for timing the several operations to cause during each revolution of the support a parison to be formed and during the next revolution, the parison thus formed to be blown to final form, means to move each neck-ring away from the blow mold and to project it outside of the path of movement of the molds, and means to open each neck-ring to release the finished article while thus projected.

9. In a press and blow machine for forming articles of glassware, the combination of a rotary support, a press and blow mechanism mounted on said support and comprising a press mold, means for pressing a mold charge therein, a blow mold, means for blowing the parison formed from said mold charge to final form in said blow mold, a neck-ring device including a pair of neck rings from one of which the parison is suspended and by which it is transferred to the blow mold, means for timing the several operations to cause during each revolution of the support a parison to be formed and during the next revolution, the parison thus formed to be blown to final form, an annular cover for each neck-ring, said cover being normally elevated above their associated neck-rings, neck-ring opening means interposed between each cover and its associated neck-ring, and means automatically operative as each neck-ring is shifted from the blow mold back toward the press mold to depress its associated cover and thereby to cause the release of the formed article from the neck ring associated with the cover so depressed.

10. In a press and blow machine for forming articles of glassware, the combination of a rotary support, a press and blow mechanism mounted on said support and comprising a press mold, a press head for forming the mold charges into blanks in said mold, a blow mold, a blow head for expanding the blanks to final form in the blow mold, means for rotating the press head, a carrier, means for periodically rotating the carrier, a pair of neck-rings mounted to rotate on said carrier and arranged to be brought alternately into operative relation with said press mold and said blow mold by the movement of the carrier, and means whereby the neck-rings are rotated by the press head while blanks are suspended from the neck-rings.

11. In a press and blow machine for forming articles of glassware, the combination of a rotary support, a press and blow mechanism mounted on said support and comprising a press mold, a press head for forming the mold charges into blanks in said mold, a blow mold, a blow head for expanding the blanks to final form in the blow mold, means for imparting rotative movement to the blow head during the blowing operation, a carrier, means for periodically rotating the carrier, a pair of neck-rings mounted to rotate with respect to the carrier and arranged to be brought alternately into operative relation with said press mold and said blow mold by the movements of the carrier, and means whereby the blank is rotated by the blow head while being expanded to final form in the blow mold.

12. In a machine for forming articles of glass, the combination of a mold, a neck-ring arranged to cooperate with the mold, a forming means arranged to cooperate with the neck-ring and the mold, said forming means being mounted for rotation, a pinion moving in unison with the forming means, a flexible power driven shaft, a pinion mounted on said shaft, and means for swinging said shaft to periodically bring the second pinion into and out of mesh with the first pinion.

13. Apparatus for forming hollow glassware of the paste mold type, comprising a rotary support, a blank mold thereon, means for introducing glass into said blank mold, means for pressing the glass in said blank mold to form a blank, means for removing said blank mold from about said blank, means for puff blowing said blank while unconfined to form a parison, means for timing all of the above named means to cause their occurrence during a single revolution of said support, a blow mold on said support, means for blowing said parison to final form in said blow mold during at least a part of the succeeding revolution of said support and means for causing a relative rotation between the glass and the blow mold during at least a portion of the time final blowing pressure is being applied to the interior of the glass within the blow mold.

14. Apparatus for forming hollow glassware of the paste mold type, comprising a rotary support, a blank mold mounted thereon, means for introducing glass into said blank mold, means for pressing the glass in said blank mold to form a blank, means for removing said blank mold from about said blank, means for puff blowing said blank while unconfined to form a parison, means operative during the puff blowing operation for rotating said blank, means operating during at least a portion of the puff blowing and rotating of said blank for reheating the blank by externally applied heat, means for timing all of the above named means to cause their occurrences during a single revolution of the said support, a blow mold on said support, means for blowing said parison as formed by the preceding operations to final form in said blow mold during at least a part of the succeeding revolution of said support and means for causing a relative rotation between the glass and the blow mold during at least a portion of the time final blowing pressure is being applied to the interior of the glass within the blow mold.

15. Apparatus for forming hollow glassware of the paste mold type, comprising a rotary support, a press mold and a final blow mold mounted on said support, a carrier rotatably mounted on said support on a vertical axis eccentric to the axis of said support, two neck-rings rotatably mounted in said carrier and arranged to be brought alternately into cooperative relation with said press mold and said blow mold, means for pressing a charge of glass in one of said neck-rings and said press mold, means to move said press mold to an inoperative position leaving the pressed glass suspended from said neck-ring while said carrier is retained in a fixed position with respect to said support, means for puff blowing the glass to form a parison while thus suspended, means for then indexing said carrier to bring said parison into alignment with the operative position of said blow mold with respect to said support, means for closing said blow mold about the parison, means for blowing the parison to final form in said blow mold, means for imparting rotative movements to the neck-ring while the glass blank is being puff blown, means for imparting rotative movement to said neck-ring during the final blowing of the parison in said blow mold, and timing means to cause a parison initially formed in said press mold to be final blown in said blow mold during at least a part of the time a succeeding parison is being formed by the parison forming means including said press mold.

16. Apparatus for forming hollow glassware of the paste mold type, comprising a rotary support, an article forming unit mounted on said support including a press mold, a combined press and blow head, a blow mold, a neck ring carrier, a pair of neck-rings each rotatably mounted in said carrier and adapted to be brought by rotation of the carrier into cooperative relation with said press mold and said blow mold respectively, means to actuate said head to press a charge of glass in said press mold and one of said neck-rings, means to move said press mold to an inoperative position to leave the pressed glass depending from said neck-ring, means to admit puff blowing air to the interior of the pressed glass through said head to form a parison, means for rotating said head for a selected time during the puff blowing operation, means for subsequently final blowing the said parison in said blow mold, and timing means to cause a parison initially formed in said press mold to be final blown in said blow mold during at least a part of the time a succeeding parison is being formed by the parison forming means including said press mold.

17. Apparatus for forming hollow glassware of the paste mold type, comprising a rotary support, an article forming unit mounted on said support including a press mold, a combined press and blow head, a blow mold, a neck-ring carrier, a pair of neck-rings each rotatably mounted in said carrier and adapted alternately to be brought by the rotation of said carrier into cooperative relation with said press mold and said blow mold respectively, means to actuate said head to press a charge of glass in said press mold and one of said neck-rings, means to move said press mold to an inoperative position to leave the pressed charge depending from said neck-ring, means to admit puff blowing air to the interior of said pressed charge through said head to form a parison, means to rotate said carrier to bring said parison to a predetermined position with respect to said support for cooperation with said blow mold, means to close said blow mold about the parison at such position, a final blow head, means to impart rotative movements to said final blow head and therefrom to said neck-ring and the parison carried thereby, means to blow said parison to final form in said blow mold during the rotative movement of said blow head and neck-ring, and timing means to cause a parison initially formed in said press mold to be final blown in said blow mold during at least a part of the time a succeeding parison is being formed by the parison forming means including said press mold.

18. Apparatus for pressing glassware, comprising a mold, a press head cooperable with said mold, means for moving said press head toward said mold including a toggle mechanism, means for positively straightening said toggle mechanism to move said press head toward said mold, and a linkage interconnecting said toggle mechanism and said press head including a lever one point of which is resiliently held in a predetermined position during the normal operation of said press head but is movable to another position to permit the toggle to straighten without lowering of the press head in the event that the latter meets an obstruction in its movement toward the mold.

19. Apparatus for pressing glassware, comprising a mold, a press head mounted for vertical movement toward and away from said mold, means for lowering said press head to press an article in said mold comprising a lever one end of which is articulated to said press head, a toggle linkage connected to another point of said lever, means to positively straighten out said toggle linkage to move the second named point in such manner that the lever will be moved to lower said press head toward said mold, a third point on said lever constituting a fulcrum point about which the toggle linkage normally rotates the lever to lower said press head toward the mold, and means for resiliently holding said fulcrum point at its normal position while permitting it to be moved upon the straightening of said toggle mechanism in the event that the press head meets with an obstruction in its movement toward the mold.

20. Apparatus for forming hollow glass ware, comprising a rotary support, a blank mold and a blow mold mounted on said support, a neck-ring also movably mounted on said support and adapted to cooperate alternately with said blank mold and said blow mold, means for forming a blank in said blank mold and neck-ring, means for final blowing the blank in said neck-ring and blow mold, and means for opening said neck-ring to release said blank at a position of said neck-ring on a greater radius from the axis of said support than its position in cooperation with either said blank mold or said blow mold.

21. Apparatus for forming hollow glass articles, comprising a rotary support, a blank mold and a blow mold mounted on said support, a neck-ring movably mounted on said support and cooperable alternately with said blank mold and said blow mold, means for forming a blank in said blank mold and neck-ring when the axis of the blank mold and neck-ring are at a small radius from the axis of rotation of said support, means for blowing said blank to final form in said blow mold and said neck-ring when the axis of said blow mold and neck-ring are at an intermediate length radius of the axis of rotation of said support, and means for opening said neck-ring to release the final blown article therefrom when said neck-ring is at a position further from the axis of said support than its position in cooperation with either said blank mold or said blow mold.

22. Apparatus for forming hollow glass articles, comprising a blank mold and a blow mold having operating positions in spaced relation to one another, a carrier mounted for rotation about an axis midway between the operative positions of said blank mold and of said blow mold, a pair of neck-rings mounted in said carrier and adapted to cooperate respectively and alternately with said blank mold and said blow mold, automatic means operable at a desired time in the cycle of operation of the mechanism for indexing said carrier 180° to bring the neck-ring which was in a position in cooperation with said blank mold to a position for cooperation with the blow mold, automatic brake mechanism for slowing down the indexing movement of said carrier at the desired point, and automatic locking mechanism adapted to lock said carrier in its operative position at the end of its indexing movement and to unlock it for the next indexing movement.

Signed at Hartford, Conn., this 20th day of April, 1929.

THOMAS WAUGH, Jr.